US010819571B2

(12) United States Patent
Johnston et al.

(10) Patent No.: US 10,819,571 B2
(45) Date of Patent: Oct. 27, 2020

(54) NETWORK TRAFFIC OPTIMIZATION USING IN-SITU NOTIFICATION SYSTEM

(71) Applicant: Cisco Technology, Inc., San Jose, CA (US)

(72) Inventors: Jay Kemper Johnston, Raleigh, NC (US); David C. White, Jr., St. Petersburg, FL (US); Magnus Mortensen, Cary, NC (US); Michael Robertson, Apex, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/024,100

(22) Filed: Jun. 29, 2018

(65) Prior Publication Data

US 2020/0007388 A1 Jan. 2, 2020

(51) Int. Cl.
*H04L 12/24* (2006.01)
*H04L 12/26* (2006.01)

(52) U.S. Cl.
CPC ........ *H04L 41/083* (2013.01); *H04L 43/0894* (2013.01)

(58) Field of Classification Search
CPC .......................... H04L 41/083; H04L 43/0894
See application file for complete search history.

(56) References Cited

U.S. PATENT DOCUMENTS

| | | | |
|---|---|---|---|
| 5,812,773 A | 9/1998 | Norin | |
| 5,889,896 A | 3/1999 | Meshinsky et al. | |
| 6,108,782 A | 8/2000 | Fletcher et al. | |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — Stephen J Clawson
(74) *Attorney, Agent, or Firm* — Polsinelli PC

(57) ABSTRACT

Aspects of the disclosed technology address the problems of manually identifying and optimizing service function chaining (SFC) performance in response to changes in traffic profiles. In one aspect of the present disclosure, a method includes monitoring, by a first network component, incoming data packets; detecting, by the first network component, a change in a traffic profile of the incoming data packets; generating, by the first network component, in-band information on changes in the traffic profile; and transmitting, by the first network component, the in-band information with one or more data packets of the incoming data packets, the in-band information being used by a second network component to adjust one or more corresponding settings for servicing the incoming data packets.

20 Claims, 7 Drawing Sheets

(56) References Cited

U.S. PATENT DOCUMENTS

| | | |
|---|---|---|
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer Shankar et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 7,983,170 B2 | 7/2011 | Jackowski et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,861,396 B2 | 10/2014 | Schlenk et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0161321 A1* | 8/2003 | Karam .............. H04L 45/12 370/395.21 |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |

(56) References Cited

U.S. PATENT DOCUMENTS

| | | |
|---|---|---|
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0138917 A1 * | 6/2010 | Xia .................. G06F 21/552 726/22 |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0068087 A1 * | 3/2014 | Spencer, IV ............ H04L 47/26 709/227 |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |

(56) References Cited

U.S. PATENT DOCUMENTS

| | | |
|---|---|---|
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0036837 A1 | 2/2016 | Jain et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0111209 A1* | 4/2017 | Ward .................. H04L 41/0631 |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0324651 A1* | 11/2017 | Penno .................. H04L 45/26 |
| 2017/0339070 A1 | 11/2017 | Chang et al. |
| 2017/0359255 A1 | 12/2017 | Manghirmalani et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |
| WO | 2017186070 | 11/2017 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

(56) References Cited

OTHER PUBLICATIONS

Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-IS00103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://Iwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH," Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, Apr. 2011, 803-811, 9 pages.
Szymaniak, Michal, et al., "Latency-Driven Replica Placement", vol. 47 No. 8, IPSJ Journal, Aug. 2006, 12 pages.

(56) References Cited

OTHER PUBLICATIONS

Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11$^{th}$ International Conference on Computer and Information Science, 2012 IEEE, 5 pages.
International Search Report and Written Opinion from the International Searching Authority, dated Aug. 21, 2017, 15 pages, for corresponding International Patent Application No. PCT/US2019/038417.

\* cited by examiner

```
{
    "stream_info":{
        "source_ipv4":[
            "73.24.15.19"
        ],
        "destination_ipv4":[
            "10.0.250.100",
            "10.0.250.101"
        ],
        "source_ipv6":[
        ],
        "destination_ipv6":[
        ],
        "protocol":6,
        "l4_source_port":[
        ],
        "l4_destination_port":[
            80,
            8443:
        ],
    },
    "rate_info":[
        "rate_pps":203712,
        "rate_bps":117338112,
        "trend_pps":17.4,
        "trend_bps":1.02
    },
    "duration":[
        "total_bytes":7217318199,
        "total_pkts":182746125,
        "time_msec":88172
    }
}
```

400 — stream_info block
402 — rate_info block
404 — duration block

FIG. 4

NETWORK TRAFFIC OPTIMIZATION USING IN-SITU NOTIFICATION SYSTEM

BACKGROUND

1. Technical Field

The subject technology relates to network traffic optimization and in particular, to methods for providing an advance notice of changes in incoming traffic profiles to network devices, which enables the network devices to dynamically modify various settings for servicing incoming packets.

2. Introduction

Network Function Virtualization (NFV) technology, in combination with Software Defined Networking (SDN), promises to help transform today's carrier networks. It will transform how they are deployed and managed, and the way services are delivered. Some ultimate goals are to enable service providers to reduce costs, increase business agility, and accelerate the time to market of new services.

The utilization of NFV and SDN technologies allows the decoupling of network functions from underlying hardware so they run as software images or logical modules on commercial off-the-shelf and general purpose-built hardware. Furthermore, NFV and SDN can provide micro services architecture, where it is common to see different services of an application distributed and serviced by different containers. For example, in service chaining environment, it is common to see different service functions instantiated as different containers over one or more physical hosts.

Services chains with container components provide flexibility. The individual containers and their parameters can be tuned and optimized. Sometimes traffic patterns change too rapidly for an entire new service chain to be spun up with components tweaked for that new traffic pattern. This is important for traffic patterns that require very low latency, such as high frequency trading. In such use cases, by the time the system has rebuilt a new optimized chain for the incoming traffic pattern, some packets have been dropped and the traffic pattern may have changed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIG. 4 is an example iOAM information that may be included in a packet for transmission to a network device, according to one or more example embodiments;

DETAILED DESCRIPTION

Figure 1:
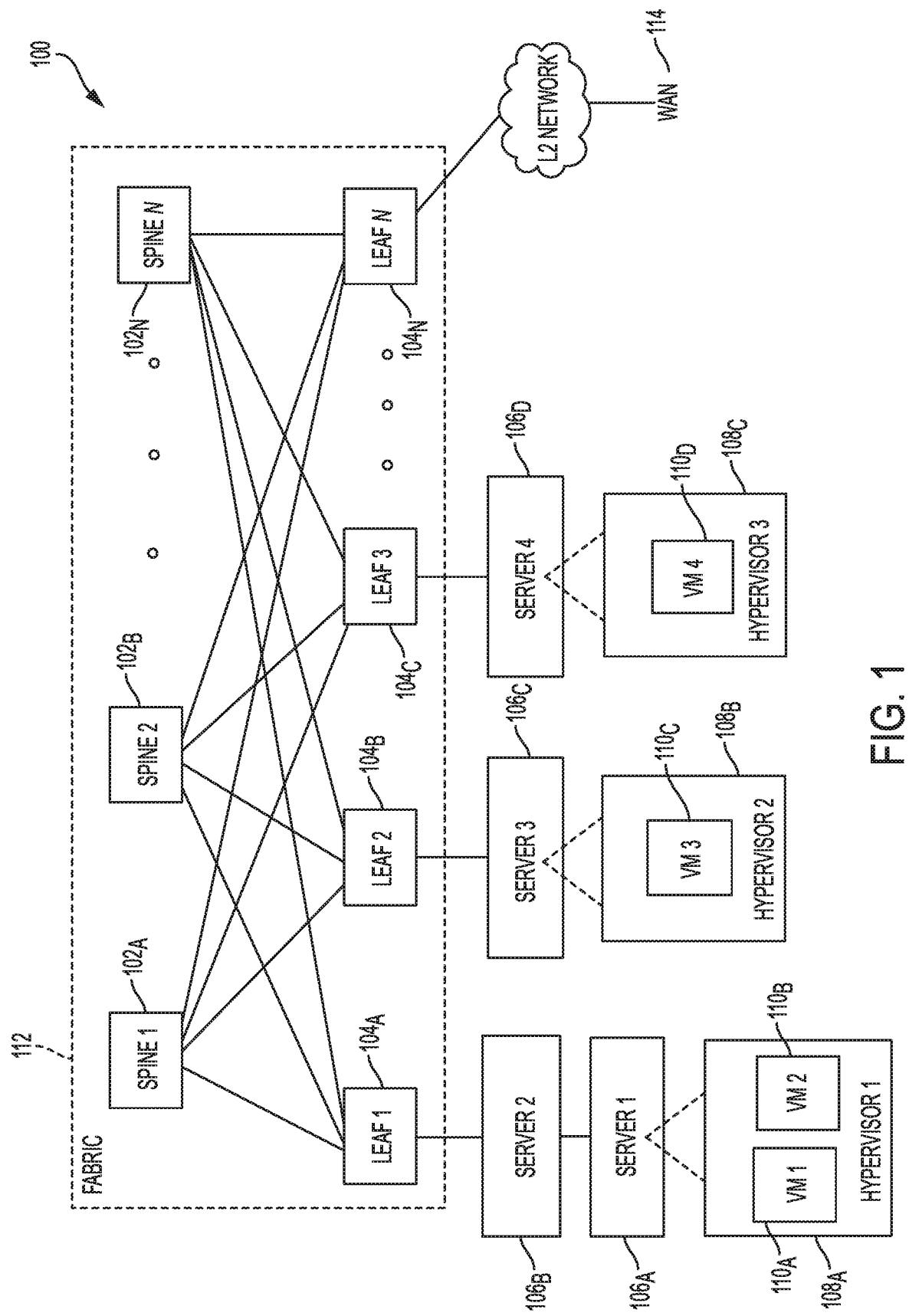
FIG. 1 illustrates an example network environment, according to one or more example embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As referenced herein, a Function Router can include a service that provides for registration and management of execution endpoints, FaaS services, functions, clients, locations, and routing rules on an account. The Function Router can receive requests for function execution from clients and dynamically route them to the 'best' endpoint to execute that function based on defined rules.

An Execution Endpoint (EE) can include a compute-capable system that can run functions. Non-limiting examples can include computers, laptops, IoT devices, servers, switches, mobile phones, kiosks, workstations, etc. EEs can be registered in the Function Router for use in executing functions. Execution endpoints can run various FaaS run-time environments and services.

A client can include a device and/or application seeking to execute a function on an Execution Endpoint. Non-limiting examples of a client can include a robot arm, mobile phone, hand scanner, application, printer, kiosk, etc.

A function can include a piece of code. The piece of code can represent, for example, an ephemeral, self-contained set of business logic. Serverless functions can be compared to stored procedures in that they do a specific thing, and are called and executed when needed, only to go back to being dormant (but ready) when execution completes.

A location can include a physical location (e.g., a building, a floor, etc.) and/or a logical location. A location can be associated with specific latitude and longitude coordinates. For example, a location can refer to specific latitude and longitude coordinates corresponding to the manufacturing floor where a robot resides or a conference room where an FaaS device is plugged in, or a region associated with an environment.

Function routing rules can include policies and controls around who, what, when, where, why, and/or how for function execution. The rules can include IT-defined guardrails that affect the entire system, and other rules specified by IT or a development team for a specific function. Example rules can include: Function A can run on any endpoint but Function B must only run on a private endpoint; or Function A can be called by any client in a specific location, but function B can only be called by specific clients in any location.

Overview

Example embodiments described herein are directed to management of changes in traffic patterns in networks by providing an advance notice of incoming traffic flow changes to network devices, which enables the network devices to dynamically modify various service chain parameters to determine optimal service chain configuration settings for servicing the incoming traffic.

In one aspect of the present disclosure, a method includes monitoring, by a first network component, incoming data packets; detecting, by the first network component, a change in a traffic profile of the incoming data packets; generating, by the first network component, in-band information on changes in the traffic profile; and transmitting, by the first network component, the in-band information with one or more data packets of the incoming data packets, the in-band information being used by a second network component to adjust one or more corresponding settings for servicing the incoming data packets.

In one aspect of the present disclosure, a device includes memory having computer-readable instructions and one or more processors configured to execute the computer-readable instructions to monitor incoming data packets; detect a change in a traffic profile of the incoming data packets; generate in-band information on changes in the traffic profile; and transmit the in-band information with one or more data packets of the incoming data packets, the in-band information being used by a network component to adjust one or more corresponding settings for servicing the incoming data packets.

In one aspect of the present disclosure, one or more non-transitory computer-readable medium having computer-readable instructions stored therein, which when executed by one or more processors, cause the one or more processors to function as a network device to monitor incoming data packets; detect a change in a traffic profile of the incoming data packets; generate in-band information on changes in the traffic profile; and transmit the in-band information with one or more data packets of the incoming data packets, the in-band information being used by another network device to adjust one or more corresponding settings for servicing the incoming data packets.

DETAILED DESCRIPTION

Aspects of the disclosed technology address the problems of manually identifying and optimizing service function chaining (SFC) performance in response to changes in traffic profiles. In one aspect, an in-band messaging scheme is provided whereby, a network component (e.g., an ingress container in a service chain), notifies other network components (other containers in a service chain, which may be upstream or downstream relative to the ingress container) of changes in incoming data traffic profile so that the other network components can dynamically and proactively adjust their parameters for servicing the incoming data packets in anticipation of the incoming traffic.

As used herein, a service chain "device" can include physical and/or virtual devices and/or components. For example, the data-path of a service chain can include a mix of physical and virtual devices that are associated with a particular network operation or service function. Additionally, service chain or service function path "parameters" can include any configurable aspect of service chain and/or device operation. For example, a service chain parameter can relate to a particular function type, software version, protocol, or any other aspect of device operation.

The disclosure begins with a brief description of an example system in which inventive concepts described herein may be implemented.

FIG. 1 illustrates an example network environment, according to one or more example embodiments. Example network environment 100 includes various network function virtualization (NFV) devices can be implemented to form a service chain (SC). Fabric 112 can represent the underlay (i.e., the physical network) of environment 100. Fabric 112 includes spine switches 1-N ($102_{A-N}$) (collectively "102") and leaf switches 1-N ($104_{A-N}$) (collectively "104"). Leaf switches 104 can reside at the edge of fabric 112, and can represent the physical network edges. Leaf switches 104 can be, for example, top-of-rack ("ToR") switches, aggregation switches, gateways, ingress and/or egress switches, provider edge devices, and/or any other type of routing or switching device.

Leaf switches 104 can be responsible for routing and/or bridging tenant or endpoint packets and applying network policies. Spine 102 can perform switching and routing within fabric 112. Thus, network connectivity in fabric 112 can flow from spine switches 102 to leaf switches 104, and vice versa.

Leaf switches 104 can include servers 1-4 (106$_{A-D}$) (collectively "106"), hypervisors 1-3 (108$_A$-108$_C$) (collectively "108"), virtual machines (VMs) 1-4 (110$_A$-110$_D$) (collectively "110"). For example, leaf switches 104 can encapsulate and decapsulate packets to and from servers 106 in order to enable communications throughout environment 100. Leaf switches 104 can also connect other network-capable device(s) or network(s), such as a firewall, a database, a server, etc., to the fabric 112. Leaf switches 104 can also provide any other servers, resources, endpoints, external networks, VMs, services, tenants, or workloads with access to fabric 112.

Servers 106 can include hardware and software necessary to implement a network function virtualization (NFV) platform of the subject technology. An NFV platform may be implemented using hypervisors 108 to support various virtual network devices, for example, that are instantiated as one or more of VMs 110, and/or one or more network containers (not illustrated).

Figure 2:
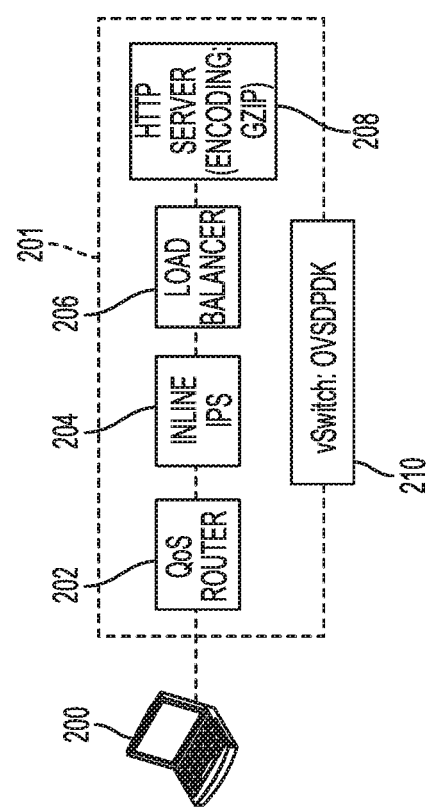
FIG. 2 conceptually illustrates a service chain, according to one or more example embodiments.

As discussed in further detail below with respect to FIG. 2, service chains that include various virtual network device types (and configurations) may be formed through, connection to a virtual switch, e.g., a 'vswitch.' FIG. 2 conceptually illustrates a service chain, according to one or more example embodiments. In particular, FIG. 2 depicts a service chain ("SC") 201.

In operation, SC 201 represents a functional service chain, for example, that is implemented in a virtual network environment, such as a network data center (DC). SC 201 may be configured to provide and/or receive traffic from a connected host 200. Host 200 can be any type of known or to be developed host that is being serviced by SC 201 including, but not limited to, electronic devices of individual end users, enterprise servers, etc. Flows (data packets) traversing SC 201 are provided sequentially to each device or service in the chain. As illustrated in the example, traffic flows traversing SC 201 may flow through a router (e.g., QoS Router 202), an inline intrusion protection system (IPS) 204, a load balancer 206, and a server (e.g., HTTP Server 208). Each of the devices or services 202, 204, 206, and 208 is communicatively coupled via virtual switch 210, for example that is implemented using an Open vSwitch with the Data Plane Development Kit (OVS-DPDK).

SC 201 can include a greater (or fewer) number of devices, and/or devices of a different function/type, without departing from the technology. Additionally, as discussed in further detail below, various settings for each device, as well as any data-path parameters for the service chain can vary depending on the desired implementation.

Having described an example network environment 100 and an example SC 201, the disclosure now turns to description of examples for in-band notification systems that provide advance notice(s) to other devices in a network (e.g., downstream or upstream devices in a network or a service chain) of upcoming changes in traffic profiles such that the other devices can immediately gain foreknowledge, and change their configurations to better deal with the higher rate of incoming data packets. The scheme allows one or more devices to take advantage of traffic flow detection capabilities of other network devices, and take actions to optimize their handling of the incoming data packets. Furthermore, such in-band notification system is intrinsically faster and more efficient than any out-of-band notification system, which makes the systems presented in this application ideal for quickly adjusting to traffic changes on established flows.

FIGS. 3A-D provide visual illustrations of example steps of an in-band notification process, according to one or more example embodiments. In FIGS. 3A-D, the connected host 200 of FIG. 2 is replaced with external network 300. External network 300 may be any known or to be developed network through which various types of hosts or other network components may send data to SC 201. This data may be referred to as incoming data traffic.

Figure 3A:
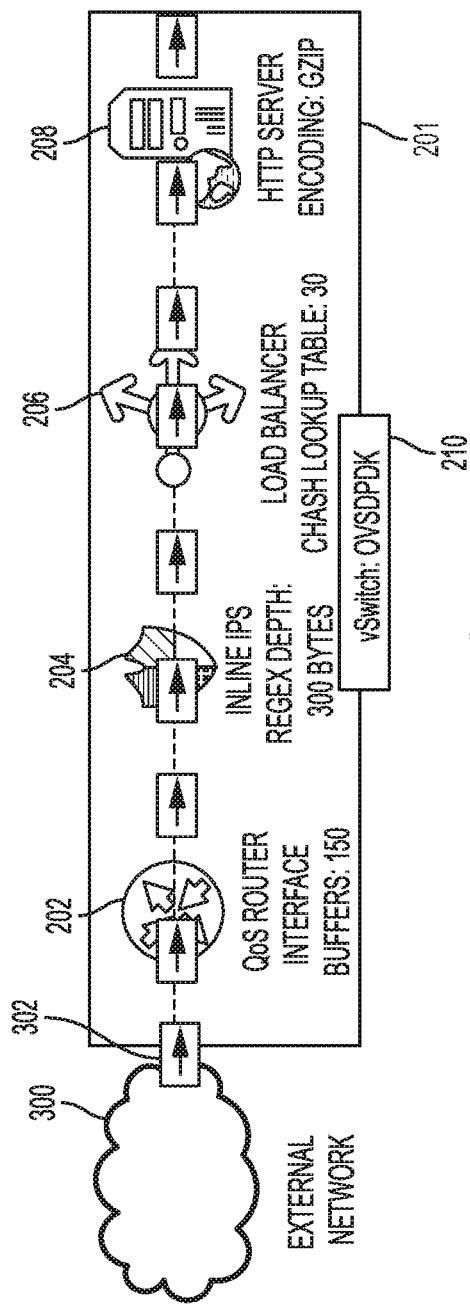
FIGS. 3A-D provide visual illustrations of example steps of an in-band notification process, according to one or more example embodiments.

In FIG. 3A, devices 202, 204, 206, 208 and 210 are all the same as those described above with reference to FIG. 2. Device 202 in the example configuration of FIGS. 3A-D may be referred to as the ingress component because it is the first component on container in SC 201 at which data packets of the incoming data traffic packets arrive.

FIG. 3A also provides one example traffic handling parameter or setting for each of the devices 202, 204, 206 and 208 that indicates how each device treats an incoming packet. For example, QoS Router has 150 interface buffers. IPS 204 has a setting according to which its regex search depth per packet is set to 300 byes. Load balancer 206 has a CHASH (and/or any other generic HASH) lookup table that may have 30 entries. Furthermore, HTTP server 208 applies compression scheme GZIP to incoming data packets. The above are example settings with which one or more devices of SC 201 are configured. However, inventive concepts are not limited thereto and there may be more or less settings with which each device of SC 201 may be configured.

FIG. 3A illustrates a "steady state" of SC 201 in which the rate of packet flow is steady across SC 201. This is indicated by packets 302 flowing from one device to another across SC 201, where each device treats/processes a packet 302 upon arrival according to configured setting thereof.

Figure 3B:
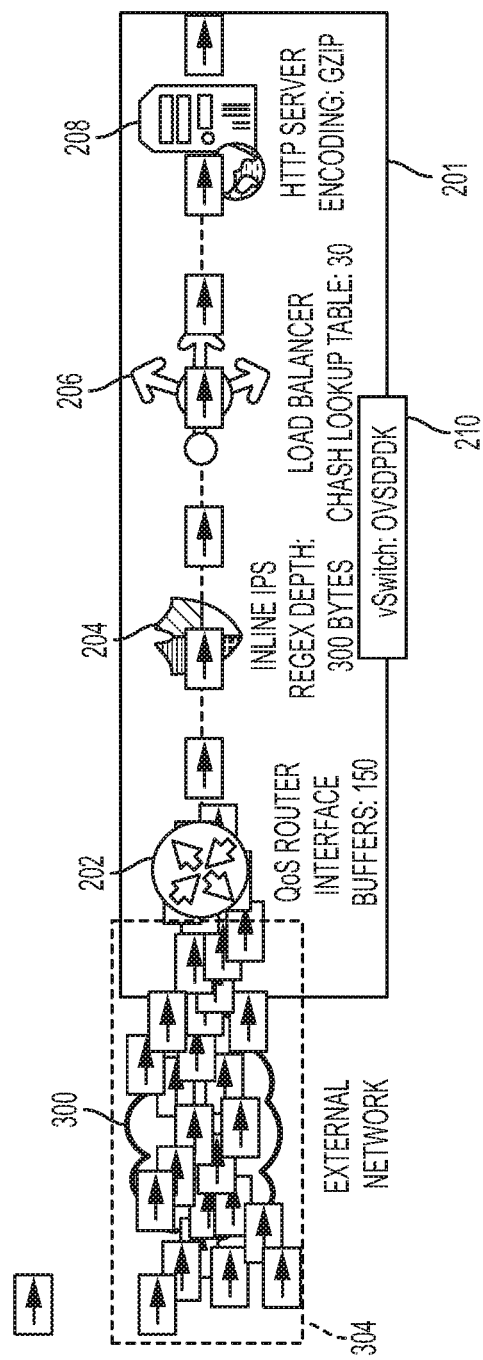

FIG. 3B illustrates an example of SC 201 where a change in traffic profile is detected and a new flood of data packets (traffic flow 304) enter SC 201 to be processed. Traffic flow 304 may also be referred to new traffic profile 304 and/or new traffic pattern 304. This change in traffic profile or pattern may be due to various reasons including, but not limited to, a particular type of application being serviced by SC 201, spike in user inquiries and requests, etc. This change in traffic profile is first detected at ingress device 202 (QoS router in this example) and an in-band operations, administration and maintenance (iOAM) information is attached to one or more data packets of the traffic flow 304 such as packet 306 shown in FIG. 3C. This packet 306 may then be sent to one or more of downstream devices 204, 206 and/or 208.

In one example, information provided as part of iOAM information in packet 306 include, but are not limited to, average packet size and rate of the new detected traffic profile, an intra-packet gap of the new traffic profile (observed most recently), statistics about communication protocols of data included in the new detected traffic profile, sources and end points of data packets, etc.

FIG. 4 is an example iOAM information that may be included in a packet for transmission to a network device, according to one or more example embodiments. As can be seen from FIG. 4, this example iOAM information includes a stream information portion 400, a rate information portion 402 and a duration information portion 404.

Stream information portion 400 includes characteristics of the data stream that are used to identify the traffic flow 304. In the examples of FIGS. 3A-D and 4, the incoming stream may be coming from one host (e.g., source_ipv4 address shown in FIG. 4) via external network 300 to be transmitted to two destinations (e.g., two desitnation_ipv4 addresses shown in FIG. 4). The protocol is TCP(6) and the destination appears to be a combination of port 80 and 8443. In this example, the source port remains empty, which is indicative of a varied source in this example traffic.

Rate information portion 402 includes the current detected rate of the traffic both in packets per second and bytes per second. In this example, iOAM information also includes trends of packets per second and bytes per second rates. For example, the trend_pps is 17.4, which indicates that the packets per second has spiked to 1740% relative to a prior rate. This can constitute an indication of an attack and thus a change in traffic profile. Furthermore, the trend_bps is 1.02, which is indicative of the overall increase in bytes per second of only 102% relative to a prior rate. Considering trend_bps and/or trend_pps together, QoS router 202 can detect a sharp spike of small packet (e.g., a DoS attack), indicating a change in incoming traffic profile.

Duration information 404 may include details about how long traffic flow 304 has persisted, the total bytes and total packet counts seen by QoS router 202.

The above provides various examples of data that may be conveyed to other network devices of SC 201 via iOAM information included in a data packet of a series of data packets that constitute traffic flow 304. However, inventive concepts are not limited thereto and other types of known or to be developed data may also be included.

Upon receiving an iOAM as part of a received data packet such as data packet 306, a downstream network device such as IPS 204 may dynamically reconfigure its traffic handling setting(s) to accommodate the higher rate of influx of data packets. In describing FIG. 3A, it was mentioned that an example setting of IPS 204 may be the regex search depth per packet expressed in bytes (e.g., 300 bytes). In one example and as a result of receiving the iOAM as part of data packet 306, IPS 204 may reconfigure its example regex search depth to 100 bytes instead of 300 bytes to accommodate the higher rate of incoming data packets. This change is illustrated in FIG. 3D. Furthermore, FIG. 3D also illustrates an example where virtual switch 210 has swapped from OVS-DPDK to Vector Packet Processing (VPP) for handling data packets of the changed traffic profile because VPP may scale better for this particular traffic profile vs the other vSwitch types. For example, switching to VPP may decrease latency between devices of SC 201.

In another example, knowing the type of traffic profile and rate of traffic coming based on received iOAM information, load balancer 206 may be able to optimize its load-balancing algorithm to distribute the load more evenly to endpoint servers. Alternatively, load balancer 206 could signal to spin up additional endpoint servers to handle the traffic load.

In another example, an application may receive a request tagged with iOAM data indicating an incoming flood of data packets at higher rate. The application, which may be utilizing SC 201, can proactively start horizontally scaling its containers to a level that can appropriately handle the expected load increase without waiting for impact of the incoming flood of data packets to actually on data traffic handling of containers of SC 201.

In another example, SC 201 may have two IPS containers (e.g., an upstream IPC 204 and another downstream IPS (relative to IPS 204)). Upon receiving iOAM information as part of data packet 306, upstream IPS 204 can analyze the first few packets of the flow and determine that the flow 304 is safe and secure and mark the relevant data packets as so using iOAM data. Then, the downstream IPS would then detect that meta-data tagged on the flow 304 and bypass its own inspection of the traffic, since it has already been deemed safe by a trusted device (e.g., IPS 204) in the SC 201. In another example, the two IPS may not necessary be part of the same service chain but may each be part of a different service chain communicating with one another.

Figure 5:
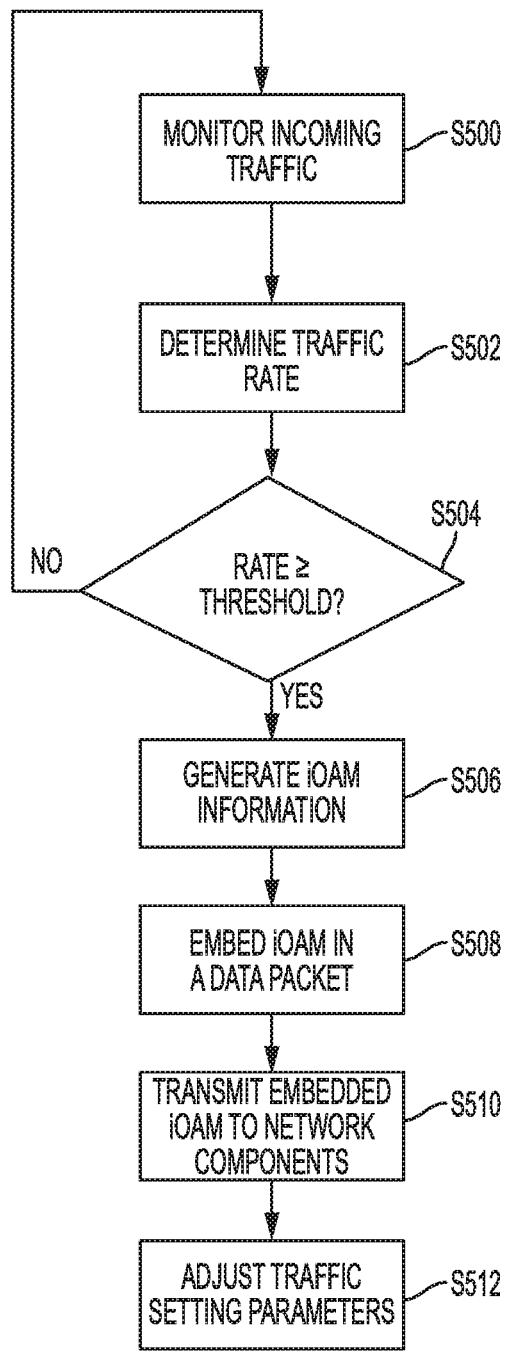
FIG. 5 illustrates an example method of in-band notification process, according to one or more example embodiments.

FIG. 5 illustrates an example method of in-band notification process, according to one or more example embodiments. FIG. 5 will be described from a perspective of a service chain and various devices thereof such as SC 201 and or one or more devices 202, 204, 206 and 208. However, it will be understood that there may be one or more processors executing computer-readable instructions to implement the functionalities of SC 201 and/or any one or more of its components.

At S500, an ingress device (component) of SC 201 (e.g., QoS router 202) monitors incoming traffic. At S502, the ingress device of SC 201 determines various statistics of the incoming traffic including, but not limited to, rate of packet arrival in packets per second, bytes per second, etc., as described above. In one example, the ingress device may perform S500 and S502 continuously.

At S504, the ingress device of SC 201 determines if the rate is equal to or greater than a threshold. The threshold may be a configurable parameter that can be determined based on experiments and/or empirical studies. For example, the threshold may be set to 100 packets per second, 1000 bytes per second, etc.

In one example, the ingress device of SC 201 may compare a single statistics (e.g., rate of packet arrival expressed in packets per second or bytes per second) to a single corresponding threshold. In another example, the ingress device of SC 201 may compare multiple statistics to multiple thresholds (e.g., rates and packet sizes) to multiple thresholds and then make the determination of S504 based on a weighted combination of all compared statistics to their corresponding thresholds.

If at S504, the ingress device of SC 201 determines the rate to be less than the threshold (this can be indicative of normal traffic flow and no significant change in the incoming traffic's profile), then the process reverts back to S500 and S500 to S504 are repeated.

However, if at S504, the ingress device of SC 201 determines the rate to be equal to or greater than the threshold (this can be indicative of a significant change in the incoming traffic's profile), then at S506, the ingress device of SC 201 generates iOAM information that describe the changed traffic pattern and is indicative of the higher rate of incoming data packets. This iOAM information can be as described above and can be embedded in one or more data packets of the incoming traffic flow.

At S508, the ingress device of SC 201 embeds the iOAM information into one or more of data packets constituting the incoming traffic flow (e.g., traffic flow 304). The one or more data packets may be randomly selected for iOAM information to be embedded therein. Alternatively, the ingress device of SC 201 creates one or more new data packet that includes the iOAM information. Packets (new or existing) that include the iOAM information may be referred to as the embedded data packet(s). An example of such packet is packet 306 described above with reference to FIG. 3C.

In one example, the embedding process of S508 may include tagging the underlying data packets with iOAM header to include the iOAM information.

Including this data in-situ provides an advantage over conventional out-of-band early warning systems because of its efficiency and relatively low complexity. Although the traffic path may initially be constrained by definition, the example JSON data above prepended in its raw form only adds ~400 bytes to a stream that may already be in excess of, for example, 7 Giga Bytes. This could further be reduced to ~230 bytes using GZIP compression provided by HTTP server 208 for example. Additionally, it requires no out-of-band signaling, which on its own would require a wholly supplemental network path, addressing, etc.

Figure 3C:
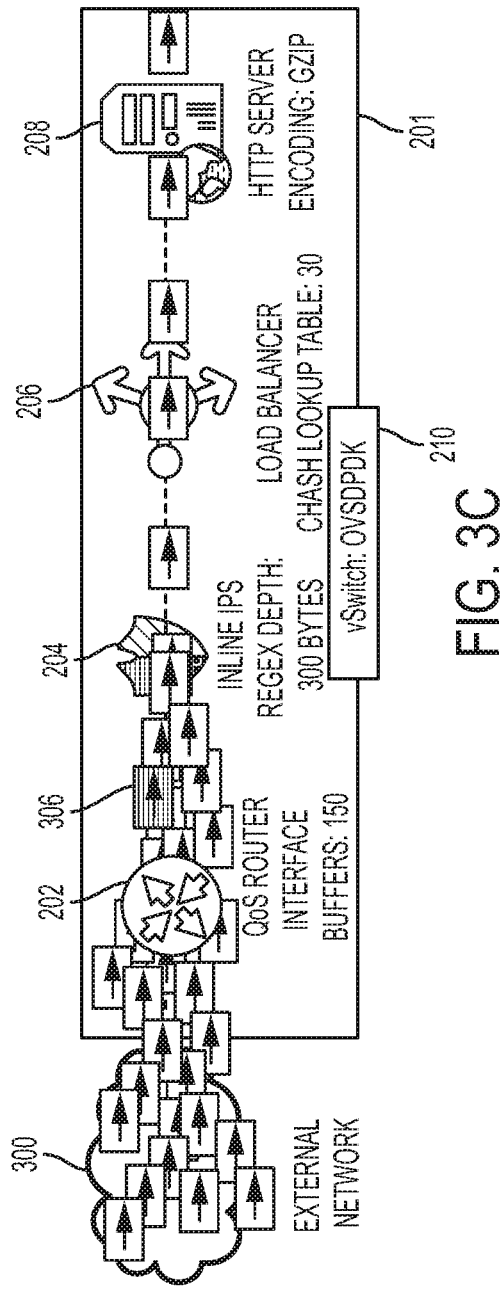
Figure 3D:
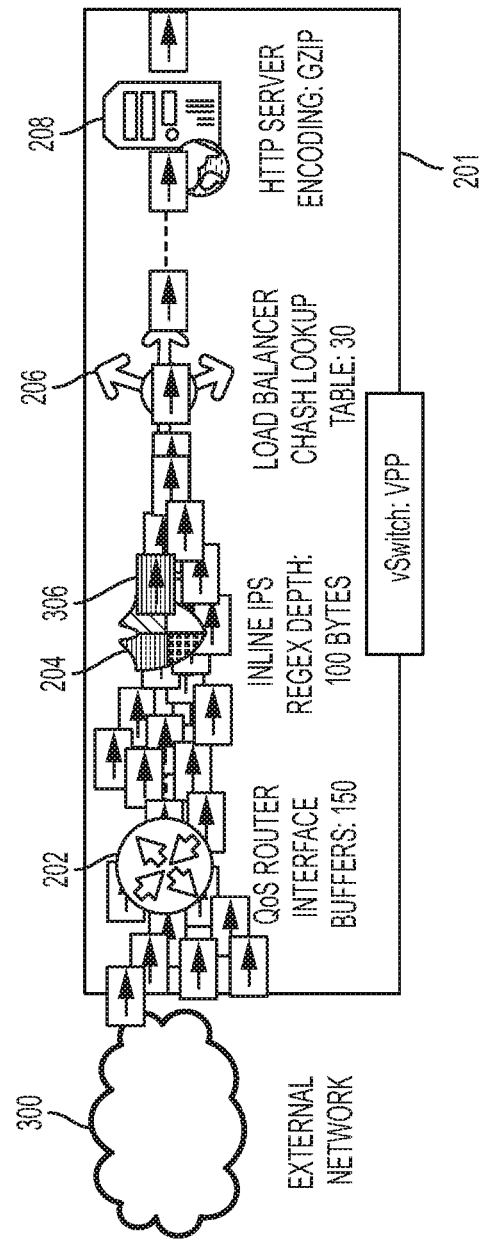

At S510, the ingress device of SC 201 sends (transmits) the embedded data packet(s) such as data packet 306 of FIG. 3C to other network device of SC 201 such as IPS 204, load balancer 206, HTTP server 208, etc., which may be referred to as the receiving device(s).

At S512 and upon receipt of the embedded data packet(s), the receiving device such as IPS 204 adjusts (reconfigures) its traffic setting parameter(s) to handle the higher rate of incoming packets.

In-situ notification system described herein differs from traditional auto-scaling schemes, which opt for constantly monitoring things like resource utilization or externally provided metrics and performing its scaling as a reaction to signs of in-progress system stress (e.g., higher rate of incoming data packets). The in-situ notification system described herein, enables network components to automatically scale in anticipation of the stress, rather than as a consequence of it, and does not require the extra overhead of continually polling an application programming interface to do so. Instead the signal to scale is already included ahead of the inbound traffic stream, in a place the system is already normally processing.

In example embodiments described above, reference is made to SC 201 which is a service chain with container components as an example of NFV. However, inventive concepts are not limited to NFV and virtual network components. For example, inventive concepts are equally applicable to physical nodes and components of a network, where one physical node may function as an ingress node for detecting a change in a traffic profile and subsequently notify downstream network components (and/or upstream network components) of the detected changes in traffic profiles so that the other network components can pro-actively adjust their traffic settings for handling the higher rate of incoming data packets.

It is understood that the foregoing examples of tunable device parameters are not exhaustive, and that other service chain qualities or configurations can be modified without departing from the scope of the technology.

Figure 6:
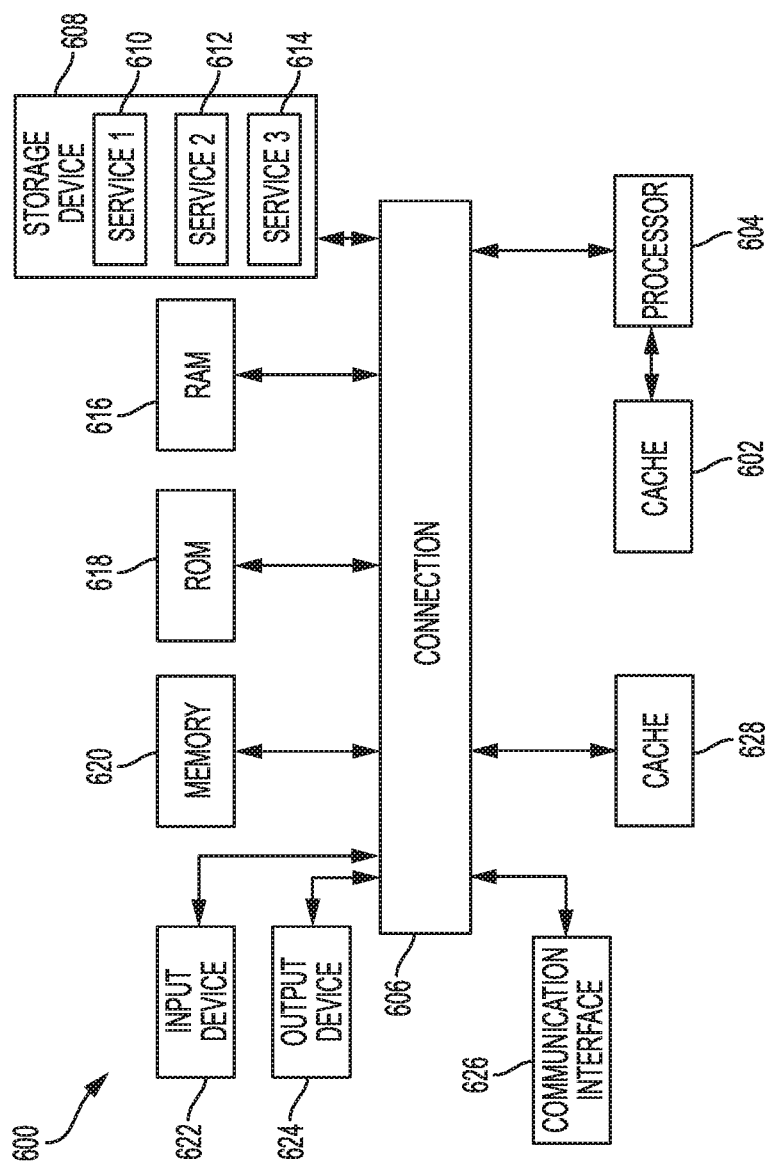
FIG. 6 illustrates an example network device, according to one or more example embodiments.

FIG. 6 illustrates an example network device, according to one or more example embodiments. The more appropriate embodiment will be apparent to those of ordinary skill in the art when practicing the present technology. Persons of ordinary skill in the art will also readily appreciate that other system embodiments are possible FIG. 6 illustrates system bus computing system architecture 600 wherein the components of the system are in electrical communication with each other using a connection 606. Exemplary system 600 includes a processing unit (CPU or processor) 604 and a system connection 606 that couples various system components including the system memory 620, such as read only memory (ROM) 618 and random access memory (RAM) 616, to the processor 604. The system 600 can include a cache of high-speed memory connected directly with, in close proximity to, or integrated as part of the processor 604. The system 600 can copy data from the memory 620 and/or the storage device 608 to the cache 602 for quick access by the processor 604. In this way, the cache can provide a performance boost that avoids processor 604 delays while waiting for data. These and other modules can control or be configured to control the processor 604 to perform various actions. Other system memory 620 may be available for use as well. The memory 620 can include multiple different types of memory with different performance characteristics. The processor 604 can include any general purpose processor and a service component, such as service 1 610, service 2 612, and service 3 614 stored in storage device 608, configured to control the processor 604 as well as a special-purpose processor where software instructions are incorporated into the actual processor design. The processor 604 may essentially be a completely self-contained computing system, containing multiple cores or processors, a bus, memory controller, cache, etc. A multi-core processor may be symmetric or asymmetric.

To enable user interaction with the computing device 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing device 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 616, read only memory (ROM) 618, and hybrids thereof.

The system 600 can include an integrated circuit 628, such as an application-specific integrated circuit (ASIC) configured to perform various operations. The integrated circuit 628 can be coupled with the connection 606 in order to communicate with other components in the system 600.

The storage device 608 can include software services 610, 612, 614 for controlling the processor 604. Other hardware or software modules are contemplated. The storage device 608 can be connected to the system connection 606. In one aspect, a hardware module that performs a particular function can include the software component stored in a computer-readable medium in connection with the necessary hardware components, such as the processor 604, connection 606, output device 624, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method comprising:
    servicing, by a first network component, incoming data packets utilizing a first packet processing framework;
    detecting, by the first network component, a change in a traffic profile of the incoming data packets;
    generating, by the first network component, in-band information on changes in the traffic profile;
    embedding, by the first network component, the in-band information within one or more first data packets of the incoming data packets;
    servicing, by a second network component, the one or more first data packets, including the in-band information, utilizing the first packet processing framework; and
    servicing, by the second network component, one or more second data packets of the incoming data packets utilizing a second packet processing framework based on the in-band information.

2. The method of claim 1, wherein the first network component and the second network component are containers of a service chain configured to service the incoming data packets.

3. The method of claim 1, wherein detecting the change in the traffic profile comprises:
    determining a characteristic of the incoming data packets;
    comparing the characteristic to a threshold; and
    detecting the change in the traffic profile if the characteristic is equal to or greater than the threshold.

4. The method of claim 3, wherein the characteristic includes a rate of incoming data packets expressed in packets per second or bytes per second.

5. The method of claim 1, further comprising:
    tagging the one or more first data packets of the incoming data packets with an in-band operation, administration and maintenance (iOAM) header that includes the in-band information.

6. The method of claim 1, wherein the one or more first data packets in which the in-band information are embedded comprise
    randomly selected packets of the incoming data packets.

7. The method of claim 1, wherein the first network component and the second network component are nodes in a chain of network components servicing the incoming data packets and the second network component is a next destination of the incoming data packets after the first network component.

8. A device comprising:
memory having computer-readable instructions stored therein; and
one or more processors configured to execute the computer-readable instructions to:
service incoming data packets utilizing a first packet processing framework;
detect a change in a traffic profile of the incoming data packets;
generate in-band information on changes in the traffic profile;
embed the in-band information within one or more first data packets of the incoming data packets;
service, by a network component, the one or more first data packets, including the in-band information, utilizing the first packet processing framework; and
service, by the network component, one or more second data packets of the incoming data packets utilizing a second packet processing framework based on the in-band information.

9. The device of claim 8, wherein the device and the network component are containers of a service chain configured to service the incoming data packets.

10. The device of claim 8, wherein the computer-readable instructions to detect the change include instructions to:
determine a characteristic of the incoming data packets;
compare the characteristic to a threshold; and
detect the change in the traffic profile if the characteristic is equal to or greater than the threshold.

11. The device of claim 10, wherein the characteristic includes a rate of incoming data packets expressed in packets per second or bytes per second.

12. The device of claim 8, wherein the computer-readable instructions to detect the change include instructions to:
tag the one or more first data packets of the incoming data packets with an in-band operation, administration and maintenance (iOAM) header that includes the in-band information.

13. The device of claim 8, wherein the one or more first data packets in which the in-band information are embedded comprise
randomly selected packets of the incoming data packets.

14. The device of claim 8, wherein the device and the network component are nodes in a chain of network components servicing the incoming data packets and are at least one of a virtual component or a physical component.

15. One or more non-transitory computer-readable medium having computer-readable instructions stored therein, which when executed by one or more processors, cause the one or more processors to function as a network device to:
service incoming data packets utilizing a first packet processing framework;
detect a change in a traffic profile of the incoming data packets;
generate in-band information on changes in the traffic profile;
embed the in-band information within one or more first data packets of the incoming data packets;
service, by another network device, the one or more first data packets, including the in-band information, utilizing the first packet processing framework; and
service, by the other network device, one or more second data packets of the incoming data packets utilizing a second packet processing framework based on the in-band information.

16. The one or more non-transitory computer-readable medium of claim 15, wherein the network device and the other network device are containers of a service chain configured to service the incoming data packets.

17. The one or more non-transitory computer-readable medium of claim 15, wherein the computer-readable instructions to detect the change include instructions to:
determine a characteristic of the incoming data packets;
compare the characteristic to a threshold; and
detect the change in the traffic profile if the characteristic is equal to or greater than the threshold.

18. The one or more non-transitory computer-readable medium of claim 17, wherein the characteristic include a rate of incoming data packets expressed in packets per second or bytes per second.

19. The one or more non-transitory computer-readable medium of claim 15, wherein the computer-readable instructions to detect the change include instructions to:
tag the one or more first data packets of the incoming data packets with an in-band operation, administration and maintenance (iOAM) header that includes the in-band information.

20. The one or more non-transitory computer-readable medium of claim 15, wherein the one or more first data packets in which the in-band information are embedded comprise
randomly selected packets of the incoming data packets.

* * * * *